(12) United States Patent
Paul

(10) Patent No.: US 6,381,745 B1
(45) Date of Patent: Apr. 30, 2002

(54) SIGNAL DISTRIBUTION SYSTEM

(75) Inventor: Lawrence Marc Paul, Randolph, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/082,652

(22) Filed: May 21, 1998

(51) Int. Cl.[7] .................................................. H04N 7/20
(52) U.S. Cl. ............................ 725/69; 725/63; 725/68; 725/71; 725/78; 455/3.02
(58) Field of Search ............................ 725/69, 68, 71, 725/63, 78, 80, 82, 85; 455/3.2, 3.1, 6.2, 6.3

(56) References Cited

U.S. PATENT DOCUMENTS

| | | | | |
|---|---|---|---|---|
| 4,057,829 A | * | 11/1977 | Moorehead .................. 358/86 |
| 5,512,963 A | * | 4/1996 | Mankovitz .................. 348/725 |
| 5,574,964 A | * | 11/1996 | Hamlin ........................ 455/3.1 |
| 5,787,335 A | * | 7/1998 | Novak ......................... 455/3.2 |
| 5,901,340 A | * | 5/1999 | Flickinger et al. ............ 455/3.1 |
| 5,926,744 A | * | 7/1999 | Fukuzawa et al. ........... 455/3.2 |
| 6,157,935 A | * | 12/2000 | Tran et al. ................... 707/503 |
| 6,177,963 B1 | * | 1/2001 | Foye et al. .................. 348/706 |

* cited by examiner

Primary Examiner—Andrew Faile
Assistant Examiner—Ngoc Vu
(74) Attorney, Agent, or Firm—Duane Morris LLP

(57) ABSTRACT

A system for distributing signals, in which a distribution module is coupled to each of a plurality of outlets by respective first and second cables. Each of the first and second cables is sufficient to carry both a first-type signal and a second-type signal between an outlet and the distribution module, the second-type signal comprising one of left-handed and right-handed polarized type signals. The first cable carries a combined first-type signal and one of a left-handed and right-handed polarized signal from the distribution module to the outlet. The second cable carries the other of the left-handed and right-handed polarized signal from the distribution module to the outlet and carries a local first-type signal from the outlet to the distribution module. The combined first-type signal is provided by the distribution module by combining the local first-type signal with a master first-type signal.

20 Claims, 3 Drawing Sheets

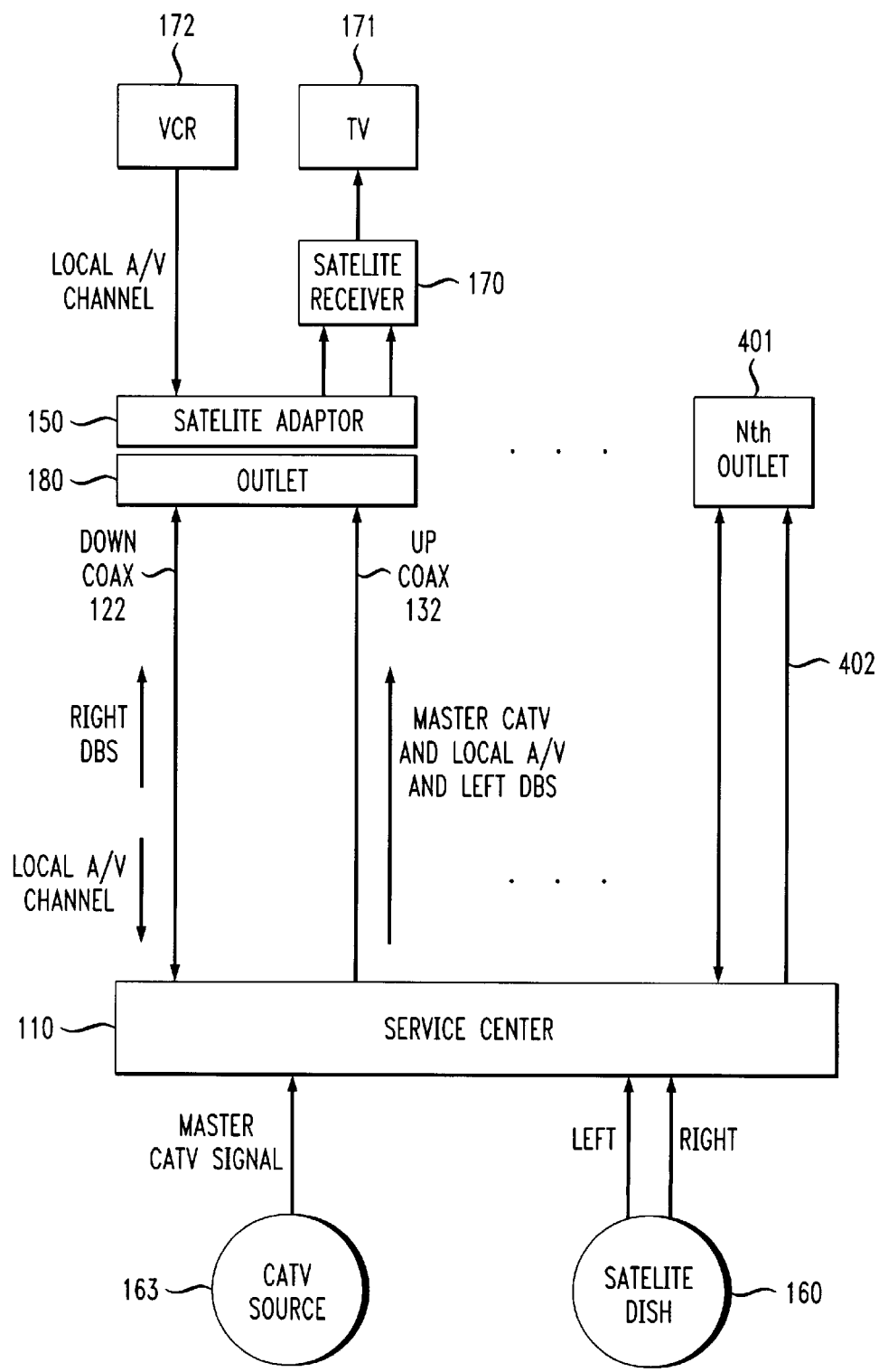

SIGNAL DISTRIBUTION SYSTEM

BACKGROUND OF THE INVENTION

1. Field of the Invention

The present invention relates to audio, video, and data signals, and, in particular, to systems for distributing and interconnecting cable television ("CATV"), satellite, and telephone data signals.

2. Description of the Related Art

It is often desirable to transmit various types of signals to or between different components or appliances in a given site or location. For example, in a residential site, it may be desirable to distribute telephone data signals, digital broadcast satellite (DBS) signals, and CATV signals to different locations and components throughout the house.

In some current usages, various signals are passed through control equipment, or a "service center," and routed to fixed destinations in the house. One problem that arises in such situations is that installation personnel and the homeowner are required to plan where they want to place a satellite receiver in advance of installation. Such estimation is often difficult, and such an approach also makes it costly to change the location of a satellite receiver. In addition, this approach typically leads to a limited number of DBS lines, for example two, which may be insufficient if the homeowner desires to use more than two satellite receivers. Further, in such approaches there is a lack of integration in the distribution of telephone data, CATV, and DBS signals. This leads to a lack of symmetry, flexibility, and accompanying drawbacks.

SUMMARY

A system, apparatus, and method for distributing signals. A distribution module is coupled to each of a plurality of outlets by respective first and second cables. Each of the first and second cables is sufficient to carry both a first-type signal and a second-type signal between an outlet and the distribution module, the second-type signal comprising one of left-handed and right-handed polarized type signals. The first cable carries a combined first-type signal and one of a left-handed and right-handed polarized signal from the distribution module to the outlet. The second cable carries the other of the left-handed and right-handed polarized signal from the distribution module to the outlet and carries a local first-type signal from the outlet to the distribution module. The combined first-type signal is provided by the distribution module by combining the local first-type signal with a master first-type signal.

BRIEF DESCRIPTION OF THE DRAWINGS

FIG. 4 is an overall system diagram illustrating the signal distribution system of FIG. 1.

DESCRIPTION OF THE PREFERRED EMBODIMENT

In the present invention, there is provided a signal distribution system which integrates and distributes telephone data, CATV, and DBS signals, and provides these signals to a plurality of similar outlets throughout a given site, such as a home. In addition, the present invention provides for flexibility in receiving audio/video (A/V) data from a selected site to be distributed to the plurality of outlets. The present invention also allows for a local area network (LAN) to be conveniently implemented.

In particular, the present invention provides means for distributing two separate "flavors" of DBS signals (i.e., left-hand and right-hand) as well as two "flavors" of TV (CATV signals from a CATV source, as well as TV signals transmitted "down" from particular locations) among a plurality of satellite adaptors/outlets, using only two coaxial cables. As described in further detail below, using only two coaxial cables for each satellite adaptor of a plurality of adaptors distributed throughout the site, both left-hand and right-hand "flavors" of DBS signals are sent "up" to each satellite adaptor (one "flavor" on each cable, respectively); a TV signal is transmitted "down," e.g. from a video camera coupled to the adaptor, via the first cable; and the combined CATV signal (which includes the CATV source signal plus all TV signals transmitted down) is transmitted "up" via the second cable to each satellite adaptor. Thus, the bandwidth of the two coaxial cables utilized for each outlet is efficiently utilized, since each cable carries a left- or right-handed polarized DBS signal up to it respective outlet, and also carries a CATV signal, either up to the outlet or back down from the outlet.

Figure 1:
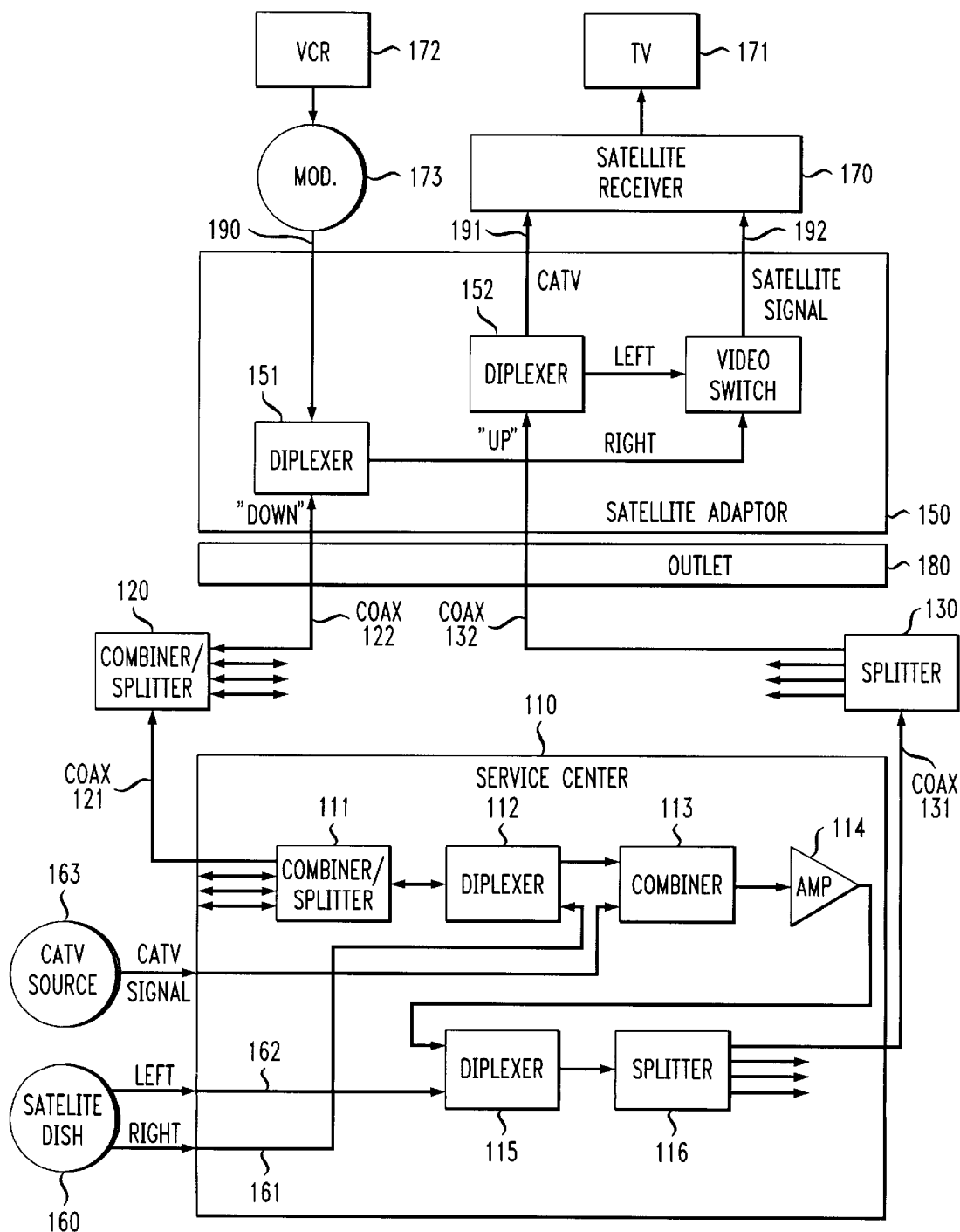
FIG. 1 is a block diagram of a signal distribution system, in accordance with an embodiment of the present invention.

Referring now to FIG. 1, there is shown is a block diagram of a signal distribution system 100, in accordance with an embodiment of the present invention. System 100 includes CATV source 163, satellite dish 160, distribution module or service center 110, combiner/splitter 120, splitter 130, outlet 180, satellite adaptor 150, VCR 172, modulator 173, TV 171, and satellite receiver 170. In alternative embodiments, combiner/splitter 120 and splitter 130 may be considered as part of service center module 110.

As illustrated, CATV source 163 (which may be a cable delivered to the home by a local CATV company) delivers a "master" CATV signal to service center 110. Satellite dish 160 is a dual low noise block-converter (LNB) dish, which provides both left-handed and right-handed polarized signals on lines 162 and 161, respectively, to service center 110. These two polarized signals may be referred to collectively as the DBS signal.

It is desirable that the DBS signal be provided at a variety of locations throughout the site, so that any number of satellite receivers may be placed at a variety of locations, as desired. It is also desirable to provide at these locations the CATV signal, as well as a telephone data connection, so that a unified and symmetrical connectivity scheme is implemented. Therefore, in the present invention, a plurality of identical wall outlets 180 is provided throughout the house, each serviced by service center 110. Each outlet 180 (described in further detail with respect to FIGS. 2 and 3) contains uniform terminals that provide access to telephone data, CATV, and DBS signals, and includes or is coupleable to a satellite adaptor 150.

Referring now to FIG. 4, there is shown an overall system diagram 400 illustrating the signal distribution system 100 of FIG. 1. As shown, a service center 110 is coupled by N (e.g., 16) pairs of co-axial cables to N locations, each having its own outlet and associated components. Service center receives as inputs a master CATV signal, and left-handed and right-handed polarized DBS signals, from CATV source 163 and satellite dish 160, respectively. Each pair of coaxial cables comprises a down coax cable 122 and an up coax cable 132. The down cable 122 is bidirectional, and carries the right-handed polarized DBS signal from the service center to outlet 180, and carries the local A/V channel from outlet 180 to service center 110. Up cable 132 carries both the combined CATV signal (i.e., the master CATV signal plus any local A/V signals) and the left-handed polarized DBS signal up to outlet 180, and is thus unidirectional. Similar signals are carried on cable pairs 402 to each of the other (N−1) outlets 401, except that the local A/V channel transmitted down to service center 110 on the down coax cable may be different from the local A/V channel transmitted by VCR 172 of outlet 180, or nonexistent.

Referring once more to FIG. 1, service center 110 is coupled via splitters 111, 120, 116, and 130 to N identical outlets such as outlet 180, each having an adaptor such as adaptor 150. Each outlet 180 also includes telephone data lines (illustrated with respect to FIGS. 2 and 3, below). N may be, for example, 16, or a different number such as 4.

Service center 110 comprises diplexers 112 and 115, combiner/splitter 111, combiner 113, amplifier 114, and splitter 116. Each satellite adaptor 150 comprises diplexers 151 and 152 and video switch 153. Each diplexer is a passive "Y" connector which either combines signals in different frequency ranges or splits a signal, while providing for appropriate impedance matching and filtering, as will be understood. A splitter such as splitter 116 receives an input signal (the output of diplexer 115) and splits this to provide four identical outputs. Each of these four outputs is fed as an input to four further splitters, such as splitter 130, each of which provides four more signals, for a total of sixteen signals. A combiner/splitter such as combiner/splitter 111 also splits an input signal received at the unified "input" terminal and provides the same input signal on four different outputs, and also combines signals received on the four "output" terminals into a single signal at the "input" terminal. For example, the signal received by combiner/splitter 111 from diplexer 112 is split and distributed out as four identical signals, to four further combiner/splitters (e.g., combiner/splitter 120). Also, combiner/splitter can receive signals at one of the four "output" lines from diplexer 151 of a given satellite adaptor 150, and combine this with any other signals received from other satellite adaptors. Video switch 153 is a two-input, one-output RF switch (such as a Channel Master 6101FD, manufactured by the Channel Master division of Avent, Inc., 1315 Industrial Park Drive, PO Box 1416, Smithfield, N.C. 27577; http://www.channelmasterinc.com/), through which an LNB block converter IF signal for a satellite receiver, from either the left-handed or right-handed polarized signal is passed, in accordance with a selecting voltage signal received from the satellite receiver.

The left-handed and right-handed polarized DBS signals received via lines 162 and 161 are typically in the 950–1600 MHz range, and the CATV signal received from CATV source 163 are typically in the 54–750 MHz range. Therefore, both a CATV signal and a right-handed or left-handed polarized signal can be combined on the same coaxial cable. Lines 121, 122, 131, and 132 are preferably coaxial cables, compliant with the CEBus standard, of a quality sufficient to carry a combined DBS and CATV signal. The CEBus standard provides a home Plug & Play™ interoperability specification for in-home networks. This specification lists "product-to-product" interoperability specifications for those products using home LANs. Product producers adhering to this specification are told how their products should behave, if they want their products to interoperate with products produced by unrelated manufacturers. The specification details a set of behavioral characteristics for products and systems within the home that will allow them to take actions based upon the state of the home. Further information regarding the CEBus standard may be found on the world-wide web at http://www.cebus.org.

Service center 110 and satellite adaptor 150 are configured so that by running only two coaxial lines 122, 132 to each wall outlet 180 and its satellite adaptor 150, each satellite adaptor 150 provides both CATV and DBS signals to a satellite receiver 170, and also can transmit a number of A/V channels of data back down to the service center, for distribution to all other outlets also coupled to service center 110. The latter A/V channels are carried back "down" to service center 110 via line 122, which is thus labeled as the "DOWN" line (line 122, however, does carry information in both directions, as explained in further detail below). Line 132 carries information only "up" to satellite adaptor 150, and is therefore labeled as the "UP" line.

Combiner 113 receives both the "master" CATV signal from CATV source 163, as well as the output of diplexer 112. As described in further detail below, the signal provided by diplexer 112 to combiner 113 is one or more "local" CATV signals sent down from one or more wall outlets, e.g. a local CATV signal sent down from VCR 172 on down line 122. VCR 172 and modulator 173 may provide a local channel of A/V data on, for example, unused channel 27, which is then fed by diplexer 151 and down line 122 to combiner/splitter 120, which then feeds the signal to combiner 111. The output of combiner 113, including master CATV signals from CATV source 163 plus local CATV data from wall outlets is a "combined" or composite CATV signal that is applied to amp 114. Amp 114 therefore provides a CATV signal to diplexer 115, which contains the information from CATV source 163 plus the channel of data from VCR 172, in addition to local data from other wall outlets. This CATV signal is then combined by diplexer 115 with the left-handed polarized DBS signal, and provided to splitter 116. This combined information is provided to sixteen identical outlets by splitter 116 and splitter 130. In particular, this information is provided via line 132 to satellite adaptor 150 through its corresponding wall outlet 180.

Diplexer 112 receives the right-handed polarized DBS signal and feeds this to combiner/splitter 111. Combiner/splitter then provides this right-handed polarized DBS signal to four combiner/splitters, including combiner/splitter 120, each of which is itself coupled to four outlets, including outlet 180 for satellite adaptor 150. Thus, the right-handed polarized DBS signal is provided to diplexer 151 of satellite adaptor 150 via down line 122. Conversely, down line 122 also carries the CATV signal from VCR 172 back "down" to service center 110. Thus, although down line 122 carries CATV signals down to service center 110, line 122 is bidirectional since it also carries the right-handed polarized DBS signal from service center 110 up to satellite adaptor 150.

Diplexer 151 feeds the right-handed polarized DBS signal from line 122 to video switch 153, and also applies the CATV signal from VCR 172 onto line 122. Diplexer 152 splits the combined left-handed polarized DBS signal and CATV signal received from line 132, and applies the CATV portion to line 191, and the left-handed polarized DBS signal portion as an input to video switch 153. Video switch 153 then applies a standard satellite receiver-compatible signal to line 192. Satellite receiver 170 thus receives both the standard CATV signal from line 191 (which contains both CATV signals from CATV source 163 plus the CATV signal produced by VCR 172) and the standard DBS signal on line 192. In response to user control of satellite receiver 170, satellite receiver delivers a desired TV channel to TV 171, i.e., a TV channels from the CATV signal or from the left-handed or right-handed polarized DBS signals. Thus, bandwidth of lines 122 and 132 is efficiently utilized, since each line 122, 132 carries a left- or right-handed polarized DBS signal up to outlet 180, and also carries a CATV signal, either up to outlet 180 or back down from outlet 180.

In alternative embodiments, different A/V sources may be coupled to line 190 instead of VCR 172. For instance, in one room a video camera monitoring a baby in a crib can be coupled to line 190 of the room's outlet. This video camera (not shown) may provide an A/V channel of CATV information on, for example, channel 68. Assuming channel 68 is unused (i.e., CATV source 163 does not provide information on channel 68), then any TV coupled to line 191 of any outlet (or any TV coupled to a satellite receiver coupled to terminals 191 and 192) may switch to channel 68 to display the video camera's output. For example, this may be used as a picture-in-picture (PIP) display while viewing another program on the TV, such as a DBS movie channel.

Additionally, a data source such as VCR 172 can transmit information "down" to service center 110 on more than one channel assuming none of these channels is used by CATV source 163 or by any other source coupled to line 190 of another outlet.

Figure 2:
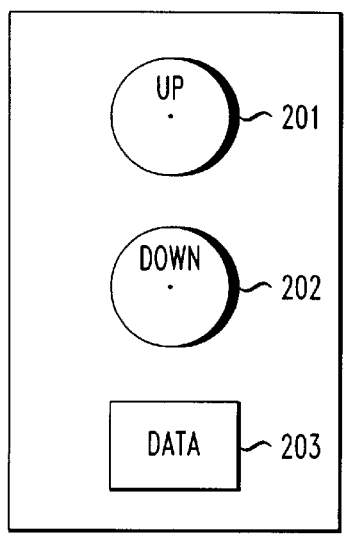
FIG. 2 is a block diagram of a front view of a wall outlet of the signal distribution system of FIG. 1.
Figure 3:
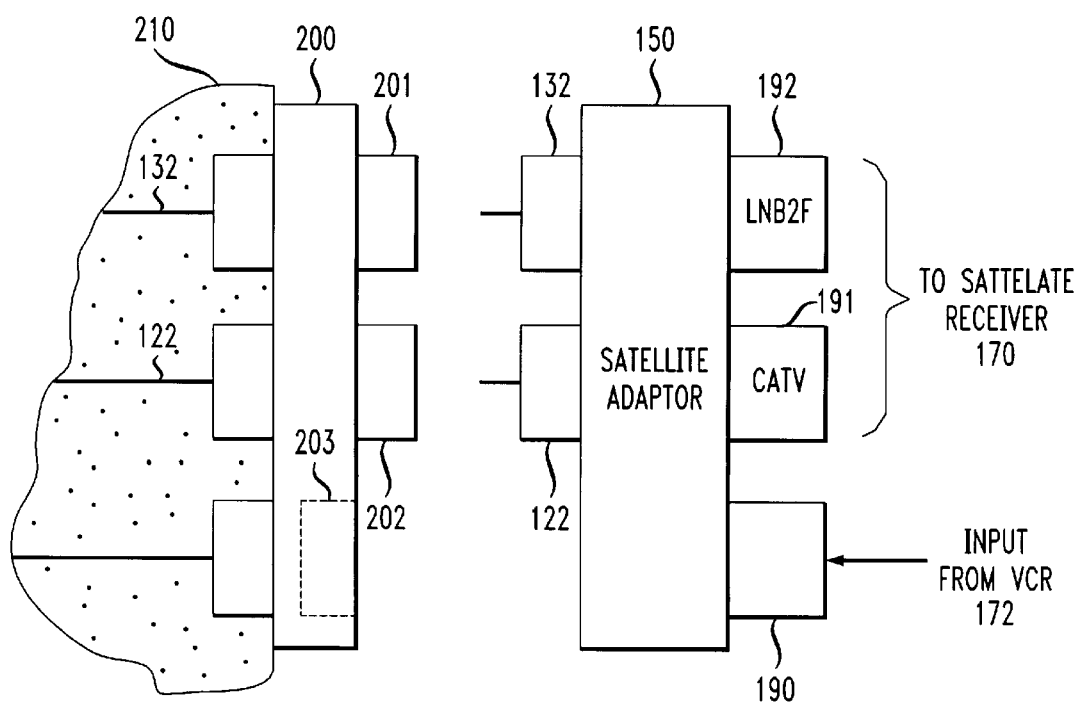
FIG. 3 depicts a side perspective view of the wall outlet of FIG. 2 and a satellite adaptor of the signal distribution system of FIG. 1.

FIG. 2 is a block diagram of a front view of the wall outlet 180 of signal distribution system 100 of FIG. 1. FIG. 3 depicts a side perspective view of wall outlet 180 and a satellite adaptor 150 of signal distribution system 100. As illustrated in FIG. 2, wall outlet 180 comprises coaxial receptacle terminals 201 and 202, which are coupled to lines 132 and 122, respectively. Outlet 180 also comprises data terminal 203. As illustrated in FIG. 3, an outlet 180 is affixed to wall 210, and may be coupled to (or may incorporate) satellite adaptor 150, by plugging terminals 132 and 122, respectively, into terminals 201 and 202.

Referring once more to FIG. 2, telephone data terminal 203 of outlet 180 preferably carries a four-pair telephone data line which is coupled to other similar terminals of the other fifteen outlets in the house. The telephone data lines (not shown) are also applied as inputs to service center 110 and thence distributed to the plurality of wall outlets.

In a preferred embodiment, lines 132 and 122 coupled to terminals 201 and 202 of each outlet are RG6 coaxial cables compliant with the CEBus standard, and the telephone line coupled to terminal 203 of each outlet is a category 5 4-pair cable. A special combined cable is run to each outlet, having all three of these cables combined with a common jacket. As will be appreciated, category 5 is an industry standard for defining the level of transmission performance of which a cable or connector system is capable. Further information of the category 5 standard and related standards may be found at the web sites of the principal standards bodies, the Electronic Industries Alliance (http://www.eia.org/) and Telecommunications Industry Association (http://www.tiaonline.org/). One principal standard in this regard is the joint standard "EIA/TIA 568A".

In an alternative embodiment, service center 110 may also contain a local area network (LAN) unit, which may be used to establish a LAN throughout the house by way of data terminals 203 of the wall outlets.

In general, therefore, the present invention provides a system for distributing signals (e.g., A/V signals) among a plurality of locations (e.g., rooms of a house) at a site (e.g., a house). The system has a plurality of wall outlets, one for each location (e.g., room), where each outlet is coupleable to an adaptor unit, such as satellite adaptor 150. The system has a distribution module (such as service center 110), which is coupled to each of the outlets by a plurality of first and second cable pairs, respectively, i.e. one first and second cable pair for each of the outlets. Each cable of a given first and second cable pair is sufficient to carry both a first-type signal and a second-type signal between an outlet and the distribution module. The first-type signal is, for example, a CATV type signal, and the second-type signal is a DBS signal (i.e., either a left-handed or right-handed polarized DBS signal). The first cable carries a composite signal having a "combined" CATV signal and a left-handed polarized DBS signal from the distribution module to the outlet. The second cable carries a right-handed polarized DBS signal from the distribution module to the outlet, and also carries a local CATV (i.e., first-type) signal from the outlet to the distribution module. (Alternatively, the first cable carries the right-handed polarized DBS signal and the second cable carries the left-handed polarized DBS signal.) The distribution module combines the local CATV signal (or local signals from several outlets) with a master CATV signal to provide the combined or composite CATV signal.

Therefore, the present invention provides a system for distribution of telephone data, CATV, and DBS signals, in which these signals are provided to a plurality of similar outlets throughout the home. In addition, the present invention provides for flexibility in receiving A/V data from a selected site to be distributed to the plurality of outlets. In particular, the present invention provides means for distributing two separate "flavors" of DBS signals (i.e., left-hand and right-hand) as well as two "flavors" of TV (CATV signals and TV signals transmitted "down" from particular locations) among a plurality of satellite adaptors/outlets, using only two coaxial cables, as described in further detail above.

In the present invention, the two DBS signals (i.e., left and right) are multiplexed onto two coaxial cables. Satellite adaptor 150 is then used to demultiplex these signals so that they may feed a standard satellite receiver as well as a standard TV. In many situations, this allows the complete distribution of both left and right DBS "feeds" to all outlets, using existing cabling, for example where the special common jacket cable is already run from the service center to various rooms. Further, in the present system, the number of satellite receivers in simultaneous use is limited only by the number of wall outlets, for example, sixteen.

In an alternative embodiment, system 100 does not include satellite adaptor module 150 for locations which do not also have a satellite receiver 170. In this embodiment, it is still possible to use one cable to carry the combined CATV signal "up" to each outlet (whether or not it has a satellite adaptor module 150) and another cable to carry a locally-generated TV signal "down" from the outlet.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A system for distributing signals, comprising:
   (a) a plurality of outlets; and
   (b) a distribution module coupled to each outlet by respective first and second cables, wherein each of the first and second cables is sufficient to carry both a first-type signal and a second-type signal between an outlet and the distribution module, the first-type signal comprising one of a local first-type signal and a master first-type signal, the second-type signal comprising one of left-handed and right-handed polarized type signals, wherein:

the first cable carries a combined first-type signal and one of a left-handed and right-handed polarized signal from the distribution module to the outlet;

the second cable carries the other of the left-handed and right-handed polarized signal from the distribution module to the outlet and carries a local first-type signal from the outlet to the distribution module; and the combined first-type signal is provided by the distribution module by combining the local first-type signal with a master first-type signal.

2. The system of claim 1, wherein the first-type signal is a cable TV (CATV) signal and the second-type signal is one of a left-handed and right-handed polarized digital broadcast satellite (DBS) signal.

3. The system of claim 2, wherein:

the local CATV signal comprises at least one channel of audio/video (A/V) data and is generated by a local CATV signal source coupled to the outlet; and the master CATV signal comprises a plurality of channels of A/V data.

4. The system of claim 3, wherein the at least one channel is a channel unused by the plurality of channels.

5. The system of claim 1, wherein each outlet is located at one of a plurality of locations at a site.

6. The system of claim 5, wherein the site is a building and each outlet is a wall outlet in a room of the building.

7. The system of claim 1, wherein the first and second cables are RG6 coaxial cables and each respective first and second cable pair are combined with a conmmon jacket to form a combined cable.

8. The system of claim 1, wherein:

the distribution module transmits to the outlet the combined first-type signal and the left-handed polarized signal via the first cable; and the distribution module transmits to the outlet the right-handed polarized signal via the second cable.

9. The system of claim 1, wherein the distribution module is further coupled to each outlet by a respective telephone line.

10. The system of claim 1, wherein the distribution module comprises:

a diplexer for receiving and combining the combined first-type signal and the left-handed polarized signal to transmit the combined first-type signal and the left-handed polarized signal to the outlet via the first cable;

a second diplexer for receiving the right-handed polarized signal from a polarized signal source and for receiving the local first-type signal from the outlet via the second cable; and a combiner for receiving the local first-type signal from the outlet via the second cable and the second diplexer, for receiving the master first-type signal from a master first-type signal source, and for combining said signals to provide the combined first-type signal.

11. The system of claim 1, wherein each outlet is coupleable to an adaptor unit, the adaptor unit comprising:

(i) a first diplexer for receiving the local first-type signal from a local first-type signal source, for receiving the right-handed polarized signal from the distribution module via the second cable, for transmitting the local first-type signal to the distribution module via the second cable, and for transmitting the right-handed polarized signal to a video switch;

(ii) a second diplexer for receiving the combined first-type signal and the left-handed polarized signal from the distribution module via the first cable, for transmitting the combined first-type signal to a first out terminal of the adaptor unit, and for transmitting the left-handed polarized signal to the video switch; and (iii) the video switch for receiving the right-handed and left-handed polarized signals and for combining said polarized signals to provide an output signal to a second out terminal of the adaptor unit.

12. The system of claim 11, further comprising an adaptor unit coupled to each outlet.

13. An apparatus for distributing signals, comprising:

(a) means for coupling the apparatus to each of a plurality of outlets via respective first and second cables for each outlet, wherein each of the first and second cables is sufficient to carry both a first-type signal and a second-type signal between an outlet and the apparatus, the first-type signal comprising one of a local first-type signal and a master first-type signal, the second-type signal comprising one of left-handed and right-handed polarized type signals;

(b) means for transmitting to the outlet a combined first-type signal and one of a left-handed and right-handed polarized signal via the first cable;

(c) means for transmitting to the outlet the other of the left-handed and right-handed polarized signal and for receiving from the outlet a local first-type signal via the second cable; and (d) means for combining the local first-type signal with a master first-type signal to provide the combined first-type signal.

14. The apparatus of claim 13, wherein the first-type signal is a cable TV (CATV) signal and the second-type signal is one of a left-handed and right-handed polarized digital broadcast satellite (DBS) signal.

15. The apparatus of claim 14, wherein:

the local CATV signal comprises at least one channel of audio/video (A/V) data and is generated by a local CATV signal source coupled to the outlet; and the master CATV signal comprises a plurality of channels of A/V data.

16. The apparatus of claim 15, wherein the at least one channel is a channel unused by the plurality of channels.

17. The apparatus of claim 13, wherein:

the apparatus transmits to the outlet the combined first-type signal and the left-handed polarized signal via the first cable; and the apparatus transmits to the outlet the right-handed polarized signal via the second cable.

18. The apparatus of claim 13, wherein:

means (a) comprises a network of combiner/splitters;

means (b) comprises a diplexer for receiving and combining the combined first-type signal and the left-handed polarized signal;

means (c) comprises a second diplexer for receiving the right-handed polarized from a polarized signal source and for receiving the local first-type signal from the outlet; and means (d) comprises a combiner for receiving the local first-type signal from the outlet and the master first-type signal from a master first-type signal source and for combining said signals to provide the combined first-type signal.

19. A method for distributing signals, comprising:
   (a) coupling a distribution module to each of a plurality of outlets via respective first and second cables for each outlet, wherein each of the first and second cables is sufficient to carry both a first-type signal and a second-type signal between an outlet and the distribution module, the first-type signal comprising one of a local first-type signal and a master first-type signal, the second-type signal comprising one of left-handed and right-handed polarized type signals;
   (b) transmitting a combined first-type signal and one of a left-handed and right-handed polarized signal from the distribution module to the outlet via the first cable;
   (c) transmitting the other of the left-handed and right-handed polarized signal from the distribution module to the outlet and receiving with the distribution module a local first-type signal from the outlet via the second cable; and
   (d) combining the local first-type signal with a master first-type signal to provide the combined first-type signal.

20. A system for distributing signals, comprising:
   (a) a plurality of outlets; and
   (b) a distribution module coupled to each outlet by respective first and second cables, wherein each of the first and second cables is sufficient to carry both a first-type signal and a second-type signal between an outlet and the distribution module, the first-type signal comprising one of a local first-type signal and a master first-type signal, the second-type signal comprising one of left-handed and right-handed polarized type signals, the distribution module comprising:
      (1) means for transmitting to the outlet a combined first-type signal and one of a left-handed and right-handed polarized signal via the first cable;
      (2) means for transmitting to the outlet the other of the left-handed and right-handed polarized signal and for receiving from the outlet a local first-type signal via the second cable; and
      (3) means for combining the local first-type signal with a master first-type signal to provide the combined first-type signal.

* * * * *